US012391216B2

United States Patent
Nikolaeva et al.

(10) Patent No.: US 12,391,216 B2
(45) Date of Patent: Aug. 19, 2025

(54) METHOD FOR PRODUCING A WIPER BLADE ELEMENT COMPRISING A COMPOSITE LAYER MADE OF A PARTICLE LAYER AND A FRICTION-REDUCING MATERIAL

(71) Applicant: Robert Bosch GmbH, Stuttgart (DE)

(72) Inventors: Daria Nikolaeva, Tienen (BE); Nicolaas Gotzen, Kortenberg (BE); Roel Dams, Geel (BE); Christian Wilms, Beringen-Koersel (BE); Peter Stassen, Uikhoven (BE); Philip Claeskens, Hasselt (BE)

(73) Assignee: Robert Bosch GmbH, Stuttgart (DE)

( * ) Notice: Subject to any disclaimer, the term of this patent is extended or adjusted under 35 U.S.C. 154(b) by 699 days.

(21) Appl. No.: 17/419,912

(22) PCT Filed: Dec. 17, 2019

(86) PCT No.: PCT/EP2019/085626
§ 371 (c)(1),
(2) Date: Jun. 30, 2021

(87) PCT Pub. No.: WO2020/141070
PCT Pub. Date: Jul. 9, 2020

(65) Prior Publication Data
US 2022/0080926 A1    Mar. 17, 2022

(30) Foreign Application Priority Data
Jan. 2, 2019   (DE) ................... 10 2019 200 001.0

(51) Int. Cl.
*B60S 1/38*    (2006.01)
*C08K 3/04*    (2006.01)
(Continued)

(52) U.S. Cl.
CPC ............... *B60S 1/38* (2013.01); *C08K 3/042* (2017.05); *C08L 7/00* (2013.01); *C08L 11/00* (2013.01);
(Continued)

(58) Field of Classification Search
CPC .............. B60S 1/38; B60S 2001/3829; B60S 2001/3898; C08K 3/042; C08L 7/00;
(Continued)

(56) References Cited

U.S. PATENT DOCUMENTS 4,079,168 A * 3/1978 Schwemmer ....... B29C 65/4835
156/283
2016/0297405 A1 * 10/2016 Bretagnol ................. B60S 1/38
2019/0168716 A1 * 6/2019 Sakurai ..................... C09D 5/00

FOREIGN PATENT DOCUMENTS

CN    206174409 U    5/2017
DE    10212682 A1 * 10/2003 ............... B60S 1/38
(Continued)

OTHER PUBLICATIONS

Translation of International Search Report for Application No. PCT/EP2019/085626 dated Apr. 23, 2020 (2 pages).

*Primary Examiner* — Nahida Sultana
(74) *Attorney, Agent, or Firm* — Michael Best & Friedrich LLP (57) ABSTRACT

The present invention relates to a method for producing a wiper blade element (10) for a wiper blade and/or a wiper blade having a wiper blade element (10), in particular for a windscreen wiper. In order to provide simple and economical wiper blade elements and wiper blades having excellent properties, in particular having high wiping quality, high abrasion resistance, a high degree of friction reduction and miming noise reduction and a long service life, in said method a particle layer (12) is applied to an elastomer substrate (11), the elastomer substrate (11) is vulcanised (Continued)

with the particle layer (12) deposited thereon, and, after vulcanisation, a friction-reducing material (13) is applied to the particle layer (12). The invention further relates to a wiper blade element and wiper blade produced in such a way.

21 Claims, 3 Drawing Sheets

(51) Int. Cl.
*C08L 7/00* (2006.01)
*C08L 11/00* (2006.01)
*C08L 23/16* (2006.01)

(52) U.S. Cl.
CPC ....... *C08L 23/16* (2013.01); *B60S 2001/3829* (2013.01); *B60S 2001/3898* (2013.01)

(58) Field of Classification Search
CPC ....... C08L 11/00; C08L 23/16; C08J 2307/00; C08J 2311/00; C08J 2423/06; C08J 7/0423; C08J 7/042
See application file for complete search history.

(56) References Cited

FOREIGN PATENT DOCUMENTS

| DE | 10226752 A1 | 1/2004 | |
|----|----|----|----|
| DE | 102007034328 A1 * | 1/2009 | ........... B29B 13/021 |
| DE | 102007036780 A1 * | 2/2009 | ............ B29C 48/08 |
| DE | 102008000928 A1 | 10/2009 | |
| DE | 102009000320 A1 | 7/2010 | |
| DE | 102012204749 A1 | 9/2013 | |
| EP | 1561656 A2 | 8/2005 | |
| JP | 2014034599 A | 2/2014 | |
| WO | 2019002335 A1 | 1/2019 | |

* cited by examiner

METHOD FOR PRODUCING A WIPER BLADE ELEMENT COMPRISING A COMPOSITE LAYER MADE OF A PARTICLE LAYER AND A FRICTION-REDUCING MATERIAL

BACKGROUND OF THE INVENTION

The present invention relates to a process for the production of a wiper rubber for a wiper blade, and/or of a wiper blade with a wiper rubber, in particular for a window wiper, and also to a wiper rubber and wiper blade thus produced.

The surface of wiper rubbers, for example for window wipers, is mostly cured by means of halogenation, for example chlorination or bromination, in order to increase the abrasion resistance of the wiper rubber and reduce the friction associated with said rubber.

In the case of wiper rubbers based on a synthetic rubber having a saturated polymer chain, for example ethylene-propylene-diene rubber (EPDM), however, the presence of the saturated polymer chain prevents curing of their surface by means of halogenation.

The documents EP 1 561 656 A2 and DE 102 26 752 A1 describe wiper blades for window wipers and processes for production thereof.

SUMMARY OF THE INVENTION

The present invention provides a process for the production of a wiper rubber for a wiper blade, and/or of a wiper blade with a wiper rubber. In particular, the process can be designed for the production of a wiper rubber for a wiper blade for a window wiper, for example for a motor vehicle, for example for an automobile, and/or of a wiper blade for a window wiper, for example for a motor vehicle, for example for an automobile.

In the process, a particle layer is applied, by way of example in a process step B1), to an elastomer substrate which is by way of example unvulcanized or only partially vulcanized.

The elastomer substrate with the particle layer applied thereon is then vulcanized by way of example in a process step V), which in particular is downstream of the process step B1).

After vulcanization, a friction-reducing material is then applied to the particle layer, for example in a process step B2), which in particular is downstream of the process step V).

The application of the particle layer, and the subsequent vulcanization, can advantageously cure the surface of the elastomer material and reduce friction. Reduced friction can moreover reduce operating noise, such as squeaking, during wiping by the wiper rubber or wiper blade—sometimes to zero. Because application of the particle layer to the, for example unvulcanized or only partially vulcanized, elastomer substrate takes place before the vulcanization, it is moreover advantageously possible to achieve at least strong adhesion and/or sometimes also strong, for example physical and/or chemical, attachment of the particles of the particle layer on the elastomer substrate, for example resulting from diffusion among polymer chains, and thus to achieve improved rubbing resistance. It is moreover possible thus to achieve high wiping quality.

Application of the friction-reducing material to the particle layer, in particular after vulcanization, can advantageously further reduce friction. The further friction reduction brought about by the friction-reducing material can in turn provide even better reduction of operating noise during wiping by the wiper rubber or wiper blade—sometimes to zero. By application of the friction-reducing material to the particle layer it is moreover possible, during wiping by the wiper rubber and, respectively, wiper blade—in contrast to use of merely a particle layer in the form of a non-continuous layer where complete prevention of direct contact between the elastomer material and a window that is to be wiped cannot be achieved—to prevent direct contact between the elastomer material and a window that is to be wiped, for example a glass window, and also in this manner to achieve even better reduction of operating noise during wiping by the wiper rubber and, respectively, wiper blade—sometimes to zero. The further friction reduction brought about by the friction-reducing material can moreover in turn further improve overall abrasion resistance. It is thus advantageously possible to ensure good wiping quality from the wiper rubber and, respectively, wiper blade over a long lifetime and, respectively, to achieve a prolonged lifetime of the wiper rubber or wiper blade.

By using a combination layer composed of a particle layer and of a friction-reducing material, it is moreover advantageously possible to provide, in comparison with sole use of a particle layer and, respectively, sole use of a layer composed of a friction-reducing material, more freedom for the optimization of important properties of the wiper rubber, in particular relating to wiping quality and/or abrasion resistance and/or friction reduction and/or reduction of operating noise. It is thus possible by way of example to design the particle layer with a view to high abrasion resistance and, substantially independently thereof, to optimize the design of the friction-reducing material with a view to greatly reduced friction and, for example, also greatly reduced operating noise, thus providing a wiper rubber with excellent properties, in particular high wiping quality, high abrasion resistance, greatly reduced friction and greatly reduced operating noise.

With sole use of an individual layer, there are generally counteracting tendencies that prevent simultaneous achievement of all of the properties technically required for wiper rubbers, for example good wiping quality, high abrasion resistance, low friction, and greatly reduced operating noise. With sole use of a single layer it is therefore possible by way of example to achieve good abrasion resistance by using high fill levels of hard particles and high layer thicknesses, but high layer thicknesses and stacking of hard particles here can lead to poor wiping quality. On the other hand, good wiping quality can be achieved here by using low fill levels of hard particles and low layer thicknesses, but this can lead to poor abrasion resistance, and also to poor noise reduction.

A combination layer composed of a particle layer and of a friction-reducing material can moreover be more easily and/or more successfully divided, for example cut, in particular with a straight cutting edge, than a single layer composed of a friction-reducing material; this likewise can have an advantageous effect on wiping quality and by way of example can have a particularly advantageous effect in the context of a production method which uses an elastomer substrate in the form of a double wiper rubber profile which, at a later juncture in the process, is divided, for example divided by cutting, to give single wiper rubber profiles.

The process of the invention can moreover advantageously be carried out as an in-line procedure, for example with all of the process steps that have been explained. It is thus advantageously possible to achieve high productivity and cost-efficiency.

The process of the invention can moreover also be used advantageously for the production of wiper rubbers based on any of the possible rubbers, also in particular based on double-bond-free and, respectively, saturated synthetic rubbers, for example ethylene-propylene-diene rubber (EPDM); the surface of these cannot be cured by means of halogenation, for example in the absence of double bonds. It is moreover thus advantageously possible to omit halogenation and to avoid problems associated therewith, for example in respect of risks to safety and to the environment, and lack of ability to implement an in-line process.

The overall result is that the process of the invention can provide, in a simple and inexpensive manner, wiper rubbers and wiper blades with excellent properties, in particular with high wiping quality, high abrasion resistance, greatly reduced friction, greatly reduced operating noise, and long lifetime.

The particle layer can in particular comprise particles. In particular, the particle layer can be configured from particles.

For the purposes of one embodiment, the particle layer is a particle monolayer. A particle monolayer here can in particular be understood as a particle layer in which at least a large proportion of the particles are arranged alongside one another on a plane and in particular there are few or no particles lying on, or stacked on, the particles adjacently arranged on the plane.

Configuration of the particle layer in the form of a particle monolayer can advantageously further improve wiping quality. This can in particular be advantageous when a production method uses an elastomer substrate in the form of a double wiper rubber profile, which at a later juncture in the process is divided, for example divided by cutting, to give wiper rubbers in the form of single wiper rubber profiles, because particles stacked on one another here can increase the difficulty of straight-line division, for example cutting, and/or can impair wiping quality.

For the purposes of another embodiment, the particle layer, in particular in process step B1), is configured in the form of a non-continuous layer.

Configuration of the particle layer in the form of a non-continuous layer here can in particular imply a particle layer in which, between the particles of the particle layer, surface regions of the elastomer substrate remain accessible and, respectively, uncovered.

Advantageously, this also permits application of the friction-reducing material between particles of the particle layer and/or on surface regions of the elastomer substrate which are accessible between particles of the particle layer.

In the case of configuration of the particle layer in the form of a non-continuous particle monolayer, it is possible, for example, to arrange at least a large proportion of the particles adjacently on a plane and at least to some extent or entirely at a distance from one another, there being in particular few or no particles lying on, or stacked on, the particles adjacently arranged on the plane.

For the purposes of another embodiment, the friction-reducing material is applied, in particular in process step B2), between particles of the particle layer and/or on surface regions of the elastomer substrate which are accessible between particles of the particle layer.

It is thus possible, by virtue of the friction-reducing material, advantageously to prevent direct contact between the elastomer material and a window that is to be wiped, for example a glass window, and it is thus also possible in this manner to achieve even better further reduction of operating noise during wiping by the wiper rubber or wiper blade—sometimes to zero.

For the purposes of another embodiment, the friction-reducing material completely fills interstices between particles of the particle layer and/or converts the particle layer originally configured in the form of a non-continuous layer to a continuous layer.

It is thus possible that the particle layer and the friction-reducing material advantageously together configure a continuous combination layer which firstly prevents direct contact between the elastomer material and a window that is to be wiped, for example a glass window, and also in this manner can achieve even better further reduction of operating noise during wiping by the wiper rubber or wiper blade—sometimes to zero. Secondly, the continuous combination layer can maintain wiping quality over a longer period.

For the purposes of another embodiment, the friction-reducing material forms, above the particle layer, in particular above the particle layer rendered continuous by the friction-reducing material, a friction-reducing layer that is in particular continuous. It is thus advantageously possible to achieve a particularly large reduction of friction. In order to achieve a certain reduction of friction and/or a certain abrasion resistance, the friction-reducing layer which is configured above the particle layer, in particular above the particle layer and, respectively, combination layer rendered continuous by the friction-reducing material, and which is in particular continuous, can advantageously be configured here with a lower layer thickness than a correspondingly designed single layer composed of a friction-reducing material; this in turn can have an advantageous effect on wiping quality.

For the purposes of another embodiment, the particle layer is formed by application of a granulate to the elastomer substrate. It is thus possible to produce the particle layer in a particularly simple and inexpensive manner.

The particle layer can in particular be applied by a dry coating process, for example by powder coating.

For the purposes of another embodiment, the particle layer is applied by powder coating, for example by means of a fluidized layer. Powder coating, for example by means of a fluidized layer, can advantageously achieve very precise adjustment of the covering of the elastomer substrate with particles of the particle layer, and in particular can configure particle monolayers, for example non-continuous particle monolayers. It is moreover advantageously possible, in a simple manner, to integrate a powder coating process, for example by means of a fluidized layer, into in-line production, and also by way of example to achieve said integration with improved safety and/or with reduced risks to the environment—in particular in comparison with halogenation.

For the purposes of another embodiment, the particle layer comprises polymer particles. In particular, the particle layer can be configured from polymer particles.

The particle layer can by way of example comprise and, respectively, be configured from, polymer particles with a molar mass that is in particular high, for example of ≥500 kg/mol. This has proven to be advantageous for the achievement of high abrasion resistance.

For the purposes of another embodiment, the particle layer comprises and, respectively, is formed from polymer particles with a molar mass of $\geq 1 \cdot 10^6$ g/mol and, respectively, of ≥1 million g/mol. This has proven particularly advantageous for the achievement of high abrasion resistance.

For the purposes of another embodiment, the particle layer comprises and, respectively, is formed from polymer particles which comprise and, respectively, are formed from polyethylene with a high molecular weight (HMWPE; high-molecular-weight polyethylene) and/or polyethylene with an ultrahigh molecular weight (UHMWPE; ultrahigh-molecular-weight polyethylene) and/or, in particular non-fluorinated, polyethylene and/or fluorinated polyethylene, for example polytetrafluoroethylene (PDFE), and/or polyphenyl ether and/or a perfluoroalkoxy polymer and/or polycarbonate and/or polyoxymethylene and/or polyacrylate and/or polyurethane.

In a specific form, the particle layer comprises and, respectively, is formed from spherical particles, for example spherical polymer particles.

The friction-reducing material and/or the friction-reducing layer can by way of example be applied by a wet, for example water-based, coating process, for example spray coating, and/or by a dry coating process, for example powder coating.

For the purposes of another embodiment, the friction-reducing material and/or the friction-reducing layer is applied by spray coating or by powder coating, for example by means of a fluidized layer. In particular, the friction-reducing material and/or the friction-reducing layer can be applied by spraying coating, for example water-based spray coating. It is thus advantageously possible to apply the friction-reducing material in a particularly simple manner between particles of the particle layer and/or on surface regions of the elastomer substrate which are accessible between particles of the particle layer, in particular with formation of a continuous layer. It is moreover also thus advantageously possible to integrate this process step into in-line production, in particular with improved safety and/or reduced risks to the environment.

The friction-reducing material and, respectively, the friction-reducing layer can in particular serve as sacrificial material and, respectively, sacrificial layer and, respectively, can be designed to undergo release during wiping by the wiper rubber and, respectively, wiper blade, and thus to reduce friction. For this purpose, the friction-reducing material and, respectively, the friction-reducing layer can comprise friction-reducing particles, in particular sacrificial-material particles.

For the purposes of another embodiment, the friction-reducing material and, respectively, the friction-reducing layer therefore comprise friction-reducing particles, in particular sacrificial-material particles.

In particular, the friction-reducing material and, respectively, the friction-reducing layer can be designed to provide lubrication for sliding contact between the elastomer material and a window that is to be wiped, for example a glass window. This can in particular be achieved via a solid lubricant.

For the purposes of another embodiment, the friction-reducing material and, respectively, the friction-reducing layer comprise solid-lubricant particles, for example graphite particles and/or polytetrafluoroethylene particles and/or polyethylene particles and/or polypropylene particles and/or molybdenum disulfide particles and/or tungsten disulfide particles. The window to be wiped, for example a glass window, can thus advantageously be lubricated during wiping, and operating noise can thus be further reduced; this cannot be achieved in said manner by the sole use of the particle layer.

For the purposes of another embodiment, the friction-reducing material and/or the friction-reducing layer comprises graphite particles and/or polytetrafluoroethylene particles and/or polyethylene particles and/or polypropylene particles and/or molybdenum disulfide particles and/or tungsten disulfide particles.

The friction-reducing material and, respectively, the friction-reducing layer can be formed from the friction-reducing (sacrificial-material) particle, for example solid-lubricant particle, for example from graphite particles and/or polytetrafluoroethylene particles and/or polyethylene particles and/or polypropylene particles and/or molybdenum disulfide particles and/or tungsten disulfide particles. The friction-reducing material can therefore be applied in a particularly simple and inexpensive manner by way of example by powder coating, for example by means of a fluidized layer.

However, it is also possible that the friction-reducing material and, respectively, the friction-reducing layer comprises the following in addition to the friction-reducing (sacrificial-material) particles, for example solid-lubricant particles, for example graphite particles and/or polytetrafluoroethylene particles and/or polyethylene particles and/or polypropylene particles and/or molybdenum disulfide particles and/or tungsten disulfide particles: at least one binder and optionally at least one crosslinking agent which by way of example is appropriate for the at least one binder. The robustness of the friction-reducing material and, respectively, of the friction-reducing layer can thus be increased and in particular adjusted in targeted manner and by way of example optimized not only in respect of good reduction of friction but also in respect of a long lifetime of the wiper rubber.

For the purposes of another embodiment, the friction-reducing material and/or the friction-reducing layer therefore moreover comprises at least one binder. By way of example, the at least one binder can comprise or be a poly(meth)acrylate, for example at least one polyacrylate and/or at least polymethacrylate, and/or at least one polyurethane and/or at least one polystyrene and/or at least one epoxy resin and/or at least one polyester and/or at least one polyether and/or at least one copolymer and/or block copolymer, in particular thereof. These polymers have proven to be particularly advantageous as binders.

For the purposes of another embodiment, the friction-reducing material and/or the friction-reducing layer therefore moreover comprises at least one crosslinking agent, in particular a crosslinking agent that is appropriate for the at least one binder. By way of example, the at least one crosslinking agent can comprise or be at least one carbodiimide and/or at least one silane, for example at least one organosiloxane, and/or at least one melamine and/or at least one amide and/or at least one phenol.

The friction-reducing (sacrificial-material) particles, for example solid-lubricant particles, for example graphite particles and/or polytetrafluoroethylene particles and/or polyethylene particles and/or polypropylene particles and/or molybdenum disulfide particles and/or tungsten disulfide particles can in particular have an average particle diameter D50 in a range of ≥1 μm to ≤30 μm, for example of ≥1 μm to ≤20 μm, by way of example of ≥1 μm to ≤10 μm.

The friction-reducing (sacrificial-material) particles, for example solid-lubricant particles, for example graphite particles and/or polytetrafluoroethylene particles and/or polyethylene particles and/or polypropylene particles and/or molybdenum disulfide particles and/or tungsten disulfide particles, of the friction-reducing material and, respectively, of the friction-reducing layer can in particular have a lower mechanical stability and/or by way of example a lower molecular weight and/or optionally a lower average particle diameter D50 than the particles, for example polymer particles, of the particle layer.

For the purposes of another embodiment, the friction-reducing material and, respectively, the friction-reducing layer and/or the particle layer is/are dried and/or hardened after the application of the friction-reducing material, for example in a process step H), in particular downstream of process step B2). The robustness of the friction-reducing material and, respectively, of the friction-reducing layer and/or of the particle layer can thus be increased and in particular adjusted in targeted manner and by way of example optimized not only in respect of good reduction of friction but also in respect of a long lifetime of the wiper rubber.

For the purposes of another embodiment, before the application of the friction-reducing material, in particular after vulcanization and before the application of the friction-reducing material, for example in a process step P) which is in particular upstream of process step B2) and by way of example downstream of process step V), the particle layer and/or surface regions of the elastomer substrate which are accessible between particles of the particle layer are pretreated by a plasma treatment and/or by a chemical surface-functionalization (primering). During the chemical surface-functionalization it is possible by way of example that functional groups, for example hydroxy groups and/or carboxy groups, are formed on the surface; these can form a covalent bond with, or enter into hydrogen bonds with, functional groups of the at least one binder of the friction-reducing material and, respectively, of the friction-reducing layer. It is thus possible to achieve increased adhesion and/or to achieve covalent chemical attachment of the friction-reducing material and, respectively, of the friction-reducing layer on the elastomer substrate and/or on the particle layer, and by way of example to lengthen the lifetime of the wiper rubber.

For the purposes of another embodiment, the elastomer substrate is extruded, for example freshly extruded, from an elastomer material, for example in a process step E) which is in particular upstream of process step B1), and/or, for example in process step B1), the particle layer is applied to an extruded, for example freshly extruded, in particular unvulcanized, elastomer substrate. Extrusion permits production and, respectively, provision of the elastomer material in a manner that is advantageous, simple and in particular also amenable to in-line processing.

For the purposes of another embodiment, the elastomer substrate comprises ethylene-propylene-diene rubber (EPDM; ethylene propylene diene monomer) and/or ethylene-propylene rubber (EPM; ethylene propylene monomer) and/or chloroprene rubber (CR) and/or natural rubber (NR). These rubbers have proven particularly advantageous for the formation of wiper rubbers with a large reduction of friction, high abrasion resistance, good wiping quality and/or a large reduction of operating noise.

For the purposes of another embodiment, the elastomer substrate is provided in the form of a double wiper rubber profile. By way of example, the elastomer substrate can be extruded, for example in process step E), from the elastomer material in the form of a double wiper rubber profile, for example from virgin material, or the elastomer substrate can be provided in the form of an extruded double wiper rubber profile, for example from virgin material.

After vulcanization, and before or after the application of the friction-reducing material, for example in a process step S) which is for example upstream or downstream of process step B2), the elastomer substrate in the form of the double wiper rubber profile can then by way of example be divided, for example divided by cutting, to give wiper rubbers, in particular in the form of single wiper rubber profiles.

It is preferable that, after the application of the friction-reducing material, for example in a process step S) downstream of process step B2), the elastomer substrate in the form of the double wiper rubber profile here is divided, for example divided by cutting, to give wiper rubbers, in particular in the form of single wiper rubber profiles. It is thus advantageously possible to achieve a better wiping quality than in the case of division before application of the friction-reducing material.

However, the elastomer substrate can optionally also be used directly in the form of a wiper rubber, in particular in the form of a single wiper rubber profile, for example extruded.

A wiper rubber produced by the process of the invention, in particular in the form of a single wiper rubber profile, can (then) be installed to give a wiper blade. A wiper blade with a wiper rubber can therefore also be produced by the process of the invention.

In respect of further technical features and advantages of the process of the invention, explicit references made here to the explanations provided in connection with the wiper rubber of the invention and with the wiper blade of the invention, and also to the figures and the description of the figures.

The invention further provides a wiper rubber for a wiper blade, produced by a process of the invention, in particular for a window wiper.

Production by means of a process of the invention can by way of example be proved by means of electron microscopy on a cross-sectional area of the wiper rubber.

In respect of further technical features and advantages of the wiper rubber of the invention, explicit references made here to the explanations provided in connection with the process of the invention and with the wiper blade of the invention, and also to the figures and the description of the figures.

The invention further provides a wiper blade, produced by a process of the invention and/or comprising a wiper rubber of the invention, for a window wiper, in particular for a vehicle.

In respect of further technical features and advantages of the wiper blade of the invention, explicit reference is made here to the explanations provided in connection with the process of the invention and with the wiper rubber of the invention, and also to the figures and the description of the figures.

BRIEF DESCRIPTION OF THE DRAWINGS

Further advantages and advantageous specific forms of the subject matter of the invention are illustrated by the drawings and the working example and are explained in the description below. It should be noted here that the drawings and the working example are merely descriptive and are not intended in any way to restrict the invention.

DETAILED DESCRIPTION

Figure 1:
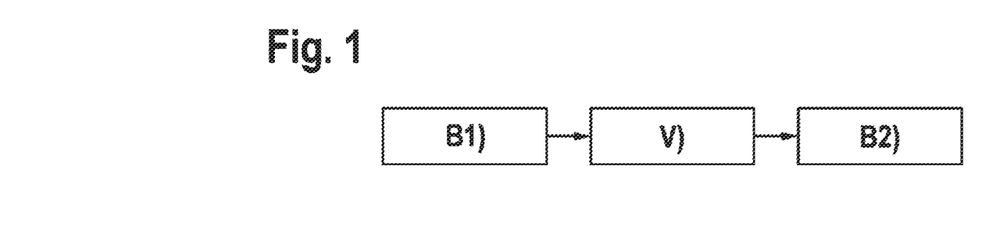
FIG. 1 shows a flow diagram to illustrate an embodiment of the process of the invention.

FIG. 1 shows a flow diagram to illustrate an embodiment of the process of the invention for the production of a wiper rubber for a wiper blade and/or of a wiper blade with a wiper rubber.

FIG. 1 illustrates that a particle layer is applied here in a process step B1) to an elastomer substrate, for example based on ethylene-propylene-diene rubber and/or ethylene-propylene rubber and/or chloroprene rubber and/or natural rubber. This can be achieved by way of example by means of powder coating. The particle layer here can in particular be configured in the form of a non-continuous particle monolayer. The particle layer here can in particular comprise polymer particles which comprise and, respectively, are formed from polyethylene with a high molecular weight and/or polyethylene with an ultrahigh molecular weight and/or polyethylene and/or fluorinated polyethylene, in particular polytetrafluoroethylene, and/or polyphenyl ether and/or a perfluoroalkoxy polymer and/or polycarbonate and/or polyoxymethylene and/or polyacrylate and/or polyurethane.

FIG. 1 moreover illustrates that, in a process step V) downstream of the process step B1), the elastomer substrate with the particle layer applied thereon is vulcanized. The vulcanization can be achieved by a heat treatment, for example in a salt bath, and/or optionally by a hot-air treatment or microwave treatment, in particular in a salt bath. It is thus possible to achieve strong attachment of the particles of the particle layer to the elastomer substrate.

FIG. 1 furthermore illustrates that, after vulcanization, in a process step B2) downstream of the process step V), a friction-reducing material is applied to the particle layer. This can be achieved by way of example by spray coating or by powder coating. The friction-reducing material here can in particular comprise friction-reducing sacrificial-material particles, for example solid-lubricant particles, for example graphite particles and/or polytetrafluoroethylene particles and/or polyethylene particles and/or polypropylene particles and/or molybdenum disulfide particles and/or tungsten disulfide particles. The friction-reducing material here can in particular be applied between particles of the particle layer and/or on surface regions of the elastomer substrate which are accessible between particles of the non-continuous particle monolayer. The friction-reducing material can completely fill interstices between particles of the particle layer and/or can convert the particle layer originally configured in the form of a non-continuous layer to a continuous layer. Furthermore, the friction-reducing material can also form, above the particle layer, in particular above the particle layer rendered continuous by the friction-reducing material, a friction-reducing layer that is continuous.

Figure 2:
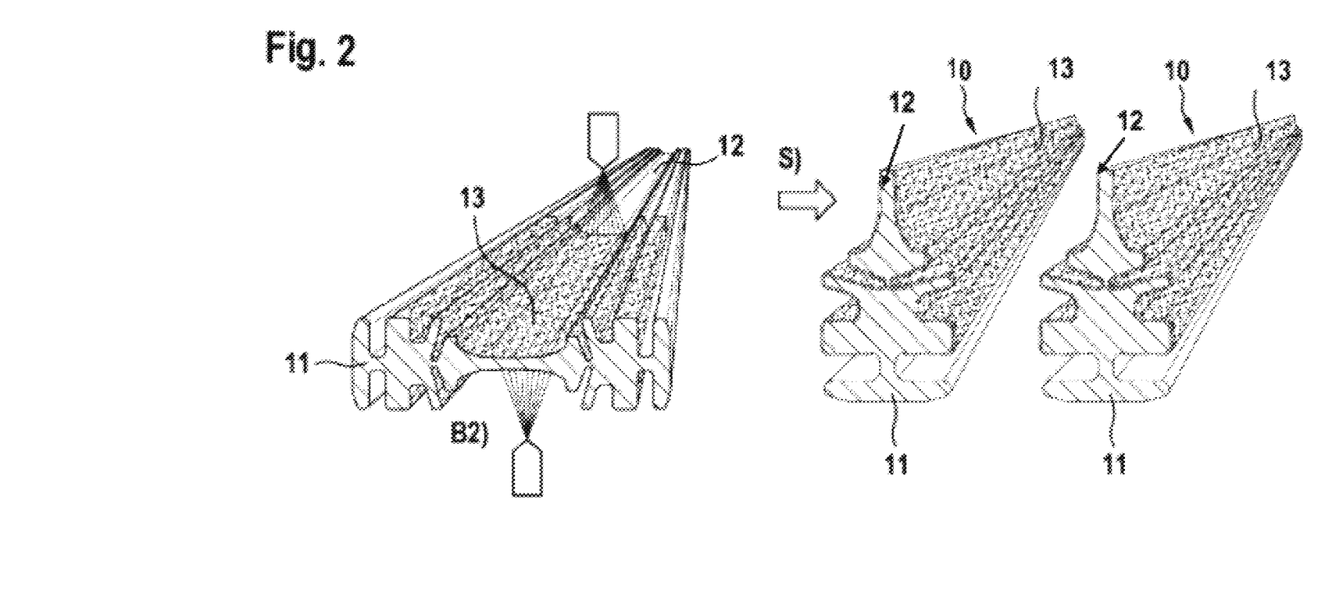
FIG. 2 shows diagrammatic perspective views to illustrate a specific form of the embodiment shown in FIG. 1 for the process of the invention by means of an elastomer substrate in the form of a double wiper rubber profile which is divided to give wiper rubbers in the form of single wiper rubber profiles.

FIG. 2 illustrates, in diagrammatic perspective views, a form of the embodiment shown in FIG. 1 for the process of the invention, where the elastomer substrate 11 is provided in the form of a, for example extruded, double wiper rubber profile. The particle layer 12 is applied to the elastomer substrate 11 in the form of the double wiper rubber profile in process step B1), and the elastomer substrate 11 with the particle layer 12 applied thereon is vulcanized in process step V) (not depicted in FIG. 2). FIG. 2 shows that, after vulcanization, the friction-reducing material 13 is applied in process step B2) by spray coating to the particle layer 12 and in particular between particles of the particle layer 12 and/or on surface regions of the elastomer substrate 11 which are accessible between particles of the particle layer. FIG. 2 shows that the elastomer substrate in the form of the double wiper rubber profile is then, in a process step S), divided, in particular divided by cutting, to give wiper rubbers in the form of single wiper rubber profiles.

FIGS. 3 to 6 illustrate that, in the context of the specific forms shown therein of the embodiment shown in FIG. 1 and/or 2 for the process of the invention, the elastomer substrate is extruded in a process step E) upstream of process step B1), in particular in the form of a double wiper rubber profile.

Figure 3:
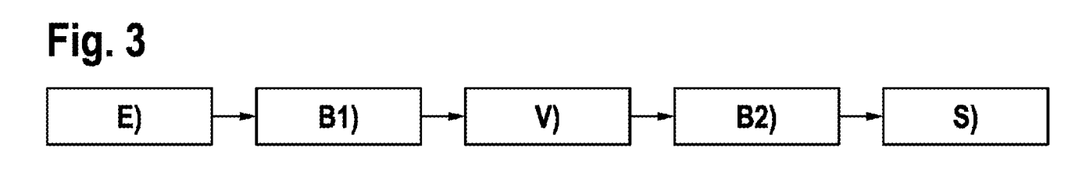
FIG. 3 shows a flow diagram to illustrate a first specific form of the embodiments shown in FIGS. 1 and 2 for the process of the invention.

In the first specific form illustrated in FIG. 3—by analogy with the specific form shown in FIG. 2—the particle layer is then applied to the elastomer substrate in the form of the double wiper rubber profile in process step B1), and the elastomer substrate with the particle layer applied thereto is vulcanized in process step V). After vulcanization, the friction-reducing material is then applied in process step B2), for example by spray coating, to the particle layer and in particular between particles of the particle layer and/or to surface regions of the elastomer substrate which are accessible between particles of the particle layer. After the application of the friction-reducing material in process step B2, the elastomer substrate in the form of the double wiper rubber profile is then, in a process step S), divided, for example divided by cutting, to give wiper rubbers in the form of single wiper rubber profiles. It is thus advantageously possible to achieve a particularly uniform layer level at the cut edge, and thus particularly high wiping quality.

Figure 4:
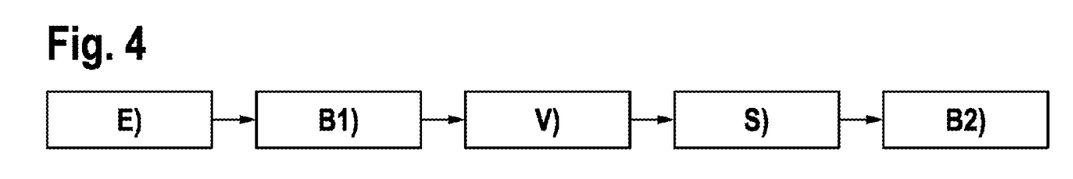
FIG. 4 shows a flow diagram to illustrate a second specific form of the embodiment shown in FIG. 1 for the process of the invention.

The second specific form, illustrated in FIG. 4, differs from the first specific form illustrated in FIG. 3 in essence in that the elastomer substrate in the form of the double wiper rubber profile is divided in process step S), for example divided by cutting, after vulcanization in process step V) and before application of the friction-reducing material in process step B2), to give wiper rubbers, in particular in the form of single wiper rubber profiles.

Figure 5:
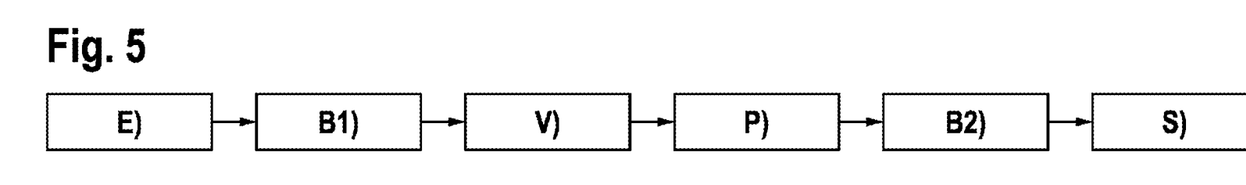
FIG. 5 shows a flow diagram to illustrate a third specific form of the embodiments shown in FIGS. 1 and 2 for the process of the invention.

The third specific form, illustrated in FIG. 5, differs from the first specific form illustrated in FIG. 3 in essence in that in a process step P) downstream of process step V) and upstream of process step B2) the particle layer and/or surface regions of the elastomer substrate which are accessible between particles of the particle layer is pretreated by a plasma treatment and/or by a chemical surface-functionalization, before application of the friction-reducing material. It is thus possible to achieve increased adhesion and/or a covalent chemical attachment of the friction-reducing material and, respectively, of the friction-reducing layer on the elastomer substrate and/or on the particle layer, and by way of example to lengthen the lifetime of the wiper rubber.

Figure 6:
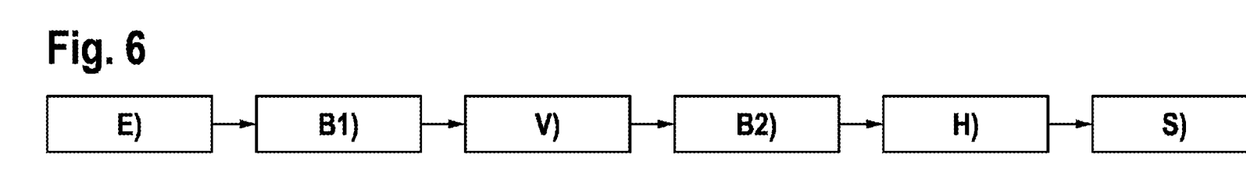
FIG. 6 shows a flow diagram to illustrate a fourth specific form of the embodiments shown in FIGS. 1 and 2 for the process of the invention.

The fourth specific form, illustrated in FIG. 6, differs from the first specific form illustrated in FIG. 3 in essence in that the friction-reducing material and/or the particle layer is dried and/or hardened in a process step H) downstream of process step B2) and upstream of process step S). The robustness of the friction-reducing material and/or of the particle layer can thus be increased and in particular adjusted in targeted manner and by way of example optimized not only in respect of a good reduction of friction but also in respect of a long lifetime of the wiper rubber.

Figure 7:
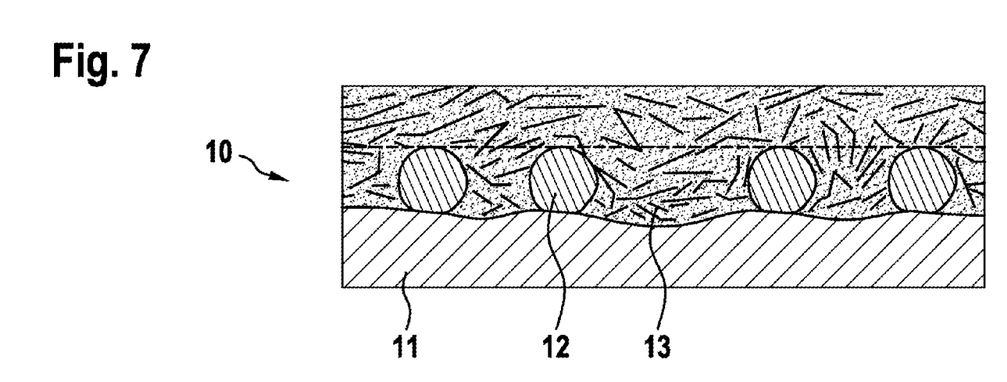
FIG. 7 shows a diagrammatic cross section through a wiper rubber produced in an embodiment of the process of the invention.

FIG. 7 shows a diagrammatic cross section through an embodiment of a wiper rubber produced in a process of the invention. The wiper-rubber embodiment shown in FIG. 7 can in particular have been produced by first applying a non-continuous particle monolayer 12 to an elastomer substrate 11, then vulcanizing the elastomer substrate 11 with the particle monolayer 12 applied thereon and, after vulcanization, applying a friction-reducing material 13 to the particle monolayer 12 in a manner such that the friction-reducing material 13 is applied not only between particles of the particle monolayer 12 but also on surface regions of the elastomer substrate 11 which are accessible between particles of the particle monolayer 12, and completely fills interstices between particles of the particle monolayer 12, and also forms a continuous layer above the particle monolayer 12. The broken horizontal line in FIG. 7 indicates that the particle monolayer 12 originally configured in the form of a non-continuous layer is thus converted to a continuous layer in the form of a combination layer composed of the particle monolayer 12 and of the friction-reducing material 13, and that the friction-reducing material 13 additionally also forms a continuous layer 13 above the particle (combination) monolayer 12 rendered continuous by the friction-reducing material 13. FIG. 7 moreover indicates that vulcanization of the elastomer substrate together with the particle monolayer 12 applied thereon can be discernible for example via slight deformation of the particles 12 and/or slight molding of the particles 12 onto the elastomer substrate 11. Such cross-sectional views can be produced under practical conditions by means of electron microscopy on cross-sectional areas.

Figure 8:
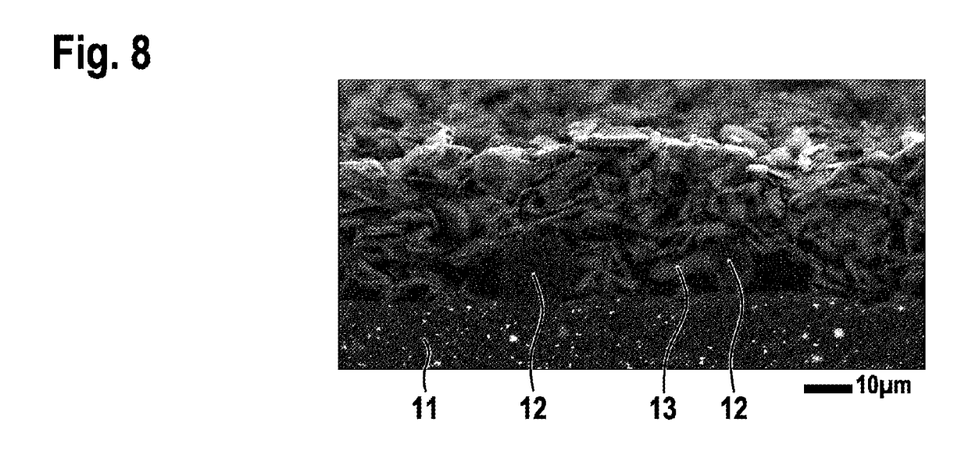
FIG. 8 shows an electron micrograph of a cross-sectional area of a working example of a wiper rubber produced in an embodiment of a process of the invention.

FIG. 8 shows an electron micrograph of a cross-sectional area of a working example of a wiper rubber produced in an embodiment of a process of the invention.

For the purposes of the working example, a wiper rubber was produced in an embodiment of a process of the invention by applying an originally non-continuous UHMW-particle monolayer 12 composed of polyethylene polymer particles with an ultrahigh molecular weight (UHMWPE) to an elastomer substrate 11 composed of ethylene-propylene-diene rubber (EPDM) by powder coating by means of a fluidized layer, and vulcanizing the elastomer substrate 11 with the UHMW-particle monolayer 12 applied thereon. After vulcanization, graphite 13 was then applied by water-based spray coating to the UHMW-particle monolayer 12, and specifically in a manner such that the graphite 13 was applied not only between UHMW particles of the UHMW-particle monolayer 12 but also on surface regions of the elastomer substrate 11 which are accessible between UHMW particles of the UHMW-particle monolayer 12, and completely filled the interstices between UHMW particles of the UHMW-particle monolayer 12, and converted the UHMW-particle monolayer 12, which was originally configured in the form of a non-continuous layer, to a continuous layer in the form of an UHMW-particle-graphite combination layer 12, 13, and furthermore also formed a continuous graphite layer 13 above the UHMW-particle monolayer 12, in particular above the UHMW-particle monolayer 12 and, respectively, UHMW-particle-graphite combination layer 12, 13 rendered continuous by the graphite 13.

The UHMW particle 12 depicted on the left in the foreground in FIG. 8 illustrates that vulcanization of the elastomer substrate 11 together with the particle monolayer 12 applied thereon can be discernible by means of electron microscopy of cross-sectional areas, for example via slight deformation of particles 12 and/or slight molding of particles 12 onto the elastomer substrate 11.

What is claimed is:

1. A process for the production of a wiper rubber for a wiper blade and/or of a wiper blade with a wiper rubber, the process comprising
    applying by a dry coating process a particle layer to an unvulcanized elastomer substrate,
    vulcanizing the elastomer substrate with the particle layer applied thereon, and
    after vulcanization, applying a friction-reducing material to the particle layer, thereby forming a friction-reducing layer, wherein the friction-reducing layer comprises friction-reducing particles and at least one binder.

2. The process of claim 1, wherein the particle layer is a particle monolayer.

3. The process of claim 1, wherein the particle layer is configured in the form of a non-continuous layer.

4. The process of claim 1, wherein the friction-reducing material is applied between particles of the particle layer and/or on surface regions of the elastomer substrate which are accessible between particles of the particle layer.

5. The process of claim 1, wherein the friction-reducing material completely fills interstices between particles of the particle layer and/or converts the particle layer originally configured in the form of a non-continuous layer to a continuous layer.

6. The process of claim 1, wherein the friction-reducing material forms, above the particle layer, a friction-reducing layer that is continuous.

7. The process of claim 1, wherein the particle layer is configured by application of a granulate to the elastomer substrate.

8. The process of claim 1, wherein the particle layer is applied by powder coating.

9. The process of claim 1, wherein the particles comprise polymer particles.

10. The process of claim 1, wherein the particle layer comprises polymer particles formed from polyethylene with a high molecular weight and/or polyethylene with an ultrahigh molecular weight and/or polyethylene and/or fluorinated polyethylene.

11. The process of claim 1, wherein the friction-reducing material and/or the friction-reducing layer is applied by spray coating or by powder coating.

12. The process of claim 1, wherein the friction-reducing material and the friction-reducing layer comprise friction-reducing sacrificial-material particles.

13. The process of claim 1, wherein the friction-reducing particles comprise graphite particles and/or polytetrafluoroethylene particles and/or polyethylene particles and/or polypropylene particles and/or molybdenum disulfide particles and/or tungsten disulfide particles.

14. The process of claim 1, wherein the at least one binder comprises a polyacrylate, a polymethacrylate, a polyurethane, a polystyrene, an epoxy resin, a polyester, a polyether, a copolymer, a block copolymer, or a combination thereof.

15. The process of claim 1, wherein the friction-reducing material and/or the friction-reducing layer further comprise(s) at least one crosslinking agent.

16. The process of claim 1, wherein after the application of the friction-reducing material, the friction-reducing material and the friction-reducing layer and/or the particle layer are dried and/or hardened.

17. The process of claim 1, wherein before the application of the friction-reducing material, the particle layer and/or surface regions of the elastomer substrate (11) which are accessible between particles of the particle layer is/are pretreated by a plasma treatment and/or by a chemical surface-functionalization.

18. The process of claim 1, wherein the elastomer substrate is extruded from an elastomer material and the particle layer is applied to an extruded elastomer substrate.

19. The process of claim 1, wherein the elastomer substrate comprises ethylene-propylene-diene rubber and/or ethylene-propylene rubber and/or chloroprene rubber and/or natural rubber.

20. The process of claim 1, wherein the elastomer substrate is a double wiper rubber profile and after vulcanization the elastomer substrate is divided by cutting to give single wiper rubber profiles.

21. The process of claim 1, wherein the particle layer comprises a plurality of particles such that the particles are arranged alongside one another on a plane, wherein the particles do not lie on or stack on the particles adjacently arranged on the plane.

* * * * *